(12) United States Patent
Grunewald

(10) Patent No.: US 12,018,171 B2
(45) Date of Patent: *Jun. 25, 2024

(54) LIQUID SILICONE COATING FOR BARRELS USED FOR AGING ALCOHOLIC BEVERAGES

(71) Applicant: DEVIL'S CASK, LLC, Fort Worth, TX (US)

(72) Inventor: Jeremy Grunewald, Land O Lakes, FL (US)

(73) Assignee: DEVIL'S CASK, LLC, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,034

(22) Filed: Oct. 26, 2022

(65) Prior Publication Data

US 2024/0124743 A1 Apr. 18, 2024

Related U.S. Application Data

(63) Continuation of application No. 17/965,451, filed on Oct. 13, 2022.

(51) Int. Cl.
*C09D 5/34* (2006.01)
*C09D 183/06* (2006.01)

(52) U.S. Cl.
CPC .................. *C09D 183/06* (2013.01)

(58) Field of Classification Search
None
See application file for complete search history.

(56) References Cited

U.S. PATENT DOCUMENTS

| | | |
|---|---|---|
| 3,189,576 A | 6/1965 | Sweet |
| 4,371,682 A | 2/1983 | Hashimoto |
| 4,503,210 A | 3/1985 | Von Au et al. |
| 4,973,623 A | 11/1990 | Haugsby et al. |
| 4,990,555 A | 2/1991 | Trego |

(Continued)

FOREIGN PATENT DOCUMENTS

WO WO-2012086334 A1 * 6/2012 ......... H01L 51/5253

OTHER PUBLICATIONS

WO-2012086334-A1, English translation (Year: 2012).*

*Primary Examiner* — Stefanie J Cohen
(74) *Attorney, Agent, or Firm* — Mark Terry

(57) ABSTRACT

A liquid coating composition of matter for application to wooden barrels or casks used in distilling, the composition of matter includes a polymer vulcanized with a silane crosslinking agent that is oxime-functional, acetoxy-functional, or alkoxy-functional, an OH-terminated polysiloxane that exhibits moisture curing, condensation reactions when in the presence of water vapors and silane crosslinkers, a low to medium molecular weight polysiloxane that exhibits low-permeance after curing via moisture-cure, condensation reaction, a transition metal catalyst that provides a reaction crosslink density that allows for minimal transport of ethanol vapors and water vapors after curing, a second transition metal catalyst that provides a reaction crosslink density with minimal impact on the rate of oxygen gas transport rate after curing, and inorganic polymers with a siloxane backbone that exhibits no leaching, migration or notable reaction with a liquid alcohol and water mixture upon curing.

18 Claims, 6 Drawing Sheets

(56) References Cited

U.S. PATENT DOCUMENTS

| | | | |
|---|---|---|---|
| 5,534,588 A | 7/1996 | Knepper et al. | |
| 8,097,689 B2 | 1/2012 | Ahn et al. | |
| 8,802,804 B2 | 8/2014 | Kim | |
| 8,937,141 B2 | 1/2015 | Sumi et al. | |
| 9,796,893 B2 | 10/2017 | Jadot et al. | |
| 9,828,523 B2 | 11/2017 | Johnson et al. | |
| 10,150,888 B2 | 12/2018 | Simon et al. | |
| 10,160,859 B2 | 12/2018 | Lanau et al. | |
| 10,294,333 B2 | 5/2019 | Liu et al. | |
| 10,640,641 B2 | 5/2020 | Ravichandran et al. | |
| 10,729,806 B2 | 8/2020 | Bingol et al. | |
| 2008/0167407 A1* | 7/2008 | Kishore | C08F 283/00 524/131 |
| 2009/0076217 A1* | 3/2009 | Gommans | C09D 183/04 524/588 |
| 2012/0065308 A1* | 3/2012 | Sumi | C08L 83/04 524/145 |
| 2022/0064457 A1 | 3/2022 | Betzig et al. | |

* cited by examiner

LIQUID SILICONE COATING FOR BARRELS USED FOR AGING ALCOHOLIC BEVERAGES

CROSS-REFERENCE TO RELATED APPLICATIONS

This patent application is a continuation of patent application Ser. No. 17/965,451 filed Oct. 13, 2022 and titled "liquid silicone coating for barrels used for aging alcoholic beverages." The subject matter of patent application Ser. No. 17/965,451 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The disclosed embodiments relate to the field of aging alcoholic beverages and, more specifically, to coatings used on wooden barrels to decrease the rate of evaporation of the aged beverage.

BACKGROUND

Spirit maturation is the process of aging a distillate, distilled spirit, or distilled alcoholic beverage (collectively referred to as "distilled alcoholic beverage") in a wooden barrel or cask for a predefined amount of time. During that time, the distilled alcoholic beverage matures through a myriad of chemical reactions. As the distilled alcoholic beverage sits in the cask, the alcohol/water solution extracts the components that naturally reside in the wood and the compounds formed during cask production. These extractives impart various flavors and add color to the distilled alcoholic beverage. Barrel-aged spirits will mature anywhere from a few months to 20 or more years, depending on the type of spirit being produced.

Wood's natural porosity allows oxygen to ingress into the barrel but more directly through the stave joints and bung. Oxygen plays a vital role in the oxidation of lignin byproducts, tannin polymerization, and indirectly in the formation of esters. These oxidative reactions give the maturing spirit many of its desirable characteristics.

One of the problems associated with barrel aging spirits is the evaporation of the distilled alcoholic beverage through the stave joints, bung, and heads of the barrel. While some evaporation is necessary to reach the proper maturity level, excessive evaporation due to environmental conditions can be problematic. This issue is commonly known as the "angels' share" and results in an average volume loss ranging from 2% to 10% per year.

Conventionally, manufacturers have tried to reduce the evaporation rate by using prefabricated membranes or plastics wrapped around the barrel's exterior. However, such wrapping materials are often hard to apply and have low abrasion resistance, which causes them to break down or become damaged when barrels are moved or rolled. Other methods used in the past include using varnish or other coating materials with highly restrictive permeability that decreases evaporation and oxygenation, making them impractical.

U.S. Pat. No. 2,865,770 is directed to whiskey aging and attempted to solve the evaporation problem by applying a coating of a semi-permeable water emulsion of polyvinyl chloride to an exterior surface of a wooden whiskey barrel. However, even though this coating material prevents evaporation of the distilled liquid due to its hydrophobic properties, particles of evaporated compounds such as alcohol will accumulate and get absorbed into the internal membrane of the coating. Such accumulation will result in a loss of permeability over time, reducing the amount of oxygen entering the barrel, thereby reducing oxygenation and harming the maturity of the liquid being aged.

U.S. Patent Application Publication No. 2016/0017265A1 is directed to the process of reducing ethanol loss while developing desirable organoleptic during wood barrel aging of alcoholic beverages. The process requires placing the barrels inside prefabricated plastic bags made of polyolefin, cyclic olefin copolymer, and ethylene norbornene copolymers. Even though these films can help reduce evaporation rates, they can be hard to apply as they require additional steps and machinery to ensure the film is tight or loose around the barrel to ensure the evaporation rate reduction of the desired method. Additionally, the durability of these films will be limited to the aging time of the barrel in which it was placed, as the films are likely to permanently deform from their original shape.

Therefore, a need exists for improvements over the prior art, particularly for a more effective and user-friendly coating for wood barrels used in aging distilled alcoholic beverages. Such improvements require the coating to be durable, have minimal impact on how the barrels are usually handled, and be easily applied while reducing the evaporation rate but not the oxygen permeance of the distilled alcoholic beverage.

SUMMARY

The claimed subject matter improves over the prior art by providing a liquid coating composition of matter that works as a vapor barrier when applied to wooden barrels used for aging distilled alcoholic beverages, thereby preventing the loss of product from evaporation during the aging process by reducing the evaporation rate without significantly altering the expected taste and smell of the aged distilled alcoholic beverage. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

A liquid coating composition of matter for application to wooden barrels or casks used in distilling, the composition of matter includes a polymer vulcanized with a silane crosslinking agent that is oxime-functional, acetoxy-functional, or alkoxy-functional, an OH-terminated polysiloxane that exhibits moisture curing, condensation reactions when in the presence of water vapors and silane crosslinkers, a low to medium molecular weight polysiloxane that exhibits low-permeance after curing via moisture-cure, condensation reaction, a transition metal catalyst that provides a reaction crosslink density that allows for minimal transport of ethanol vapors and water vapors after curing, a second transition metal catalyst that provides a reaction crosslink density with minimal impact on the rate of oxygen gas transport rate after curing, and inorganic polymers with a siloxane backbone that exhibits no leaching, migration or notable reaction with a liquid alcohol and water mixture upon curing.

Additional aspects of the disclosed embodiment will be outlined in part in the description that follows or will be evident in part from the description or learned by practicing the disclosed embodiments. The aspects of the disclosed embodiments will be attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE FIGURES

The accompanying figures, which are incorporated in and constitute part of this specification, illustrate embodiments of the claimed subject matter and, together with the description, explain the disclosed embodiments' principles. The embodiments illustrated herein are examples. It is understood, however, that the claimed subject matter is not limited to the precise arrangements and instrumentalities shown, wherein:

DETAILED DESCRIPTION

Figure 1:
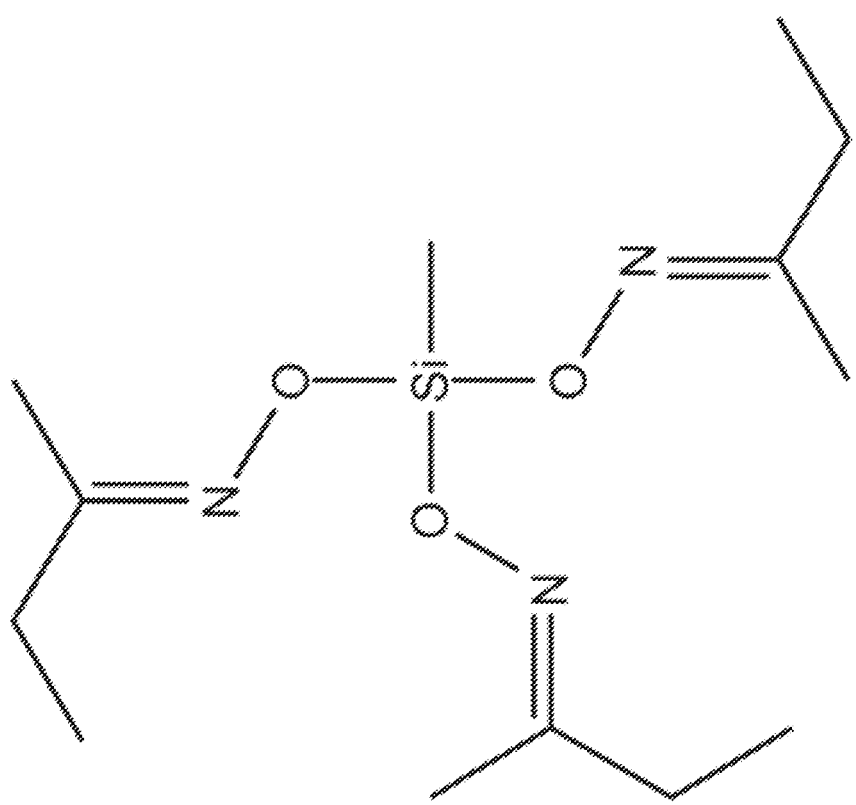
FIG. 1 is an illustration of the two-dimensional chemical structure of Methyl-tris(methylethylketoximo)silane, $C_{13} H_{27} N_3 O_3 Si$, an example compound that meets the claimed subject matter's requirements.

The following detailed description refers to the accompanying drawings. Wherever possible, the same reference numbers are used in the drawings and the following description to refer to the same or similar elements. The following detailed description comprises numerous details, examples, and embodiments of the invention, referring to the accompanying figures. However, the description of the constitutive features described below does not limit the claimed subject matter. For example, substitutions, additions, or modifications may be made to the compound matter explained. Likewise, the methods described herein may be modified by substituting, reordering, or adding stages to the disclosed methods. Accordingly, the proper scope of the claimed subject matter is defined by the appended claims.

The claimed subject matter solves the problems with the prior art by providing a liquid coating that is efficient, inexpensive to produce and can be easily applied to the exterior surface of barrels or casks to reduce the evaporation rate of the alcoholic beverage being distilled. The claimed subject matter also maintains a small amount of the distilled alcoholic beverage's exchange surface exposed to oxygen, thereby maintaining proper oxidative reactions. The claimed subject matter also is further long lasting, easy to clean and user-friendly during the application process, as it is moisture cured.

The claimed subject matter is a coating composed of a vulcanized polymer with a silane crosslinking agent, wherein the polymer has a hydroxy polysiloxane termination. When applied to aging wooden barrels as a coating, the composition of matter provides a solution for the evaporation problem. In one embodiment, the composition may comprise a functional silicone polymer, wherein the functional silicone polymer may make up more than 50% of the coating's formulation. More specifically, the coating may comprise OH-terminated siloxane polymers (greater than 80% of the total formulation) vulcanized with a crosslinking agent that is oxime-functional (3%-5% of the total formulation). One example of such a composition is Methyl-tris(methylethylketoximo)silane, $C_{13} H_{27} N_3 O_3 Si$, as shown in FIG. 1.

The claimed liquid coating composition matter is a coating composed of a vulcanized polymer with a silane crosslinking agent, wherein the polymer has a hydroxy polysiloxane termination with moisture curing characteristics. Additionally, transition metal catalysts, such as dibutyltin dilaurate and dibutyltin acetate, may be present to help accelerate the curing process and react with the other components of the claimed subject matter to reduce the transport of ethanol and water vapors out of the barrel without affecting oxygen permeance. In one embodiment, a transition metal catalyst may be used, such as a titanate compound selected from the formulae consisting of Ti(X)n wherein X is a polydentate ligand with the general formula ARARARA wherein R is a linear, branched or cyclic alkyl group having 1 to 20 carbon atoms and A is selected from N, O—, or COO—.

Due to the physical characteristics of the mixed compounds, the claimed composition of matter will initially be in liquid form, thereby facilitating its application by allowing the coating to be sprayed or otherwise applied onto an exterior surface of the wooden barrel or cask. Additionally, the coating formula will enable adherence to the external surface of the barrel for a long period of time, such as 16 to 21 years, thereby increasing the durability of the coating.

The vulcanized polymer of the claimed subject matter may be a polysiloxane, such as polydimethylsiloxane, and may have a hydroxy termination, such as silanol. A silanol is a functional group with the connectivity Si—O—H and is related to the hydroxy functional group found in all alcohols.

The claimed composition may be configured for application to wooden barrels, casks or other containers used for aging alcoholic beverages. Wooden barrels are hollow cylindrical containers made of wooden staves bound by wooden or metal hoops. They have a variety of uses, including the storage of liquids. Aging wood barrels are those used to store distilled alcoholic beverages for specific periods to allow for the distilled alcoholic beverage to mature by interacting with the wooden barrel or cask while developing other characteristics in the distilled alcoholic beverage, including flavor and color. These barrels are typically made from different types of wood, but American White Oak (*Quercus alba*), or French/English Oak (*Quercus robur*), or Sessile Oak (*Quercus petraea*) are the most common. Due to the wood's porosity and the configuration of the barrel joints and staves, oxygen ingresses into the barrel, allowing for the oxygenation of the distilled alcoholic beverage. However, due to that same porosity, water and alcohol are lost due to evaporation, causing a loss of volume in the final matured product. This presents a common problem to manufacturers, which has been solved by the claimed subject matter by reducing the rate of evaporation while still maintaining a desirable oxygenation rate.

The claimed liquid coating composition matter is a coating composed of a vulcanized polymer, which is a substance or material consisting of large molecules called macromolecules, composed of many repeating subunits. Both natural and synthetic polymers are created via the polymerization of many small molecules, known as monomers. Their large molecular mass produces unique physical properties, including toughness, high elasticity, viscoelasticity, and a tendency to form amorphous and semicrystalline structures rather than crystals. These features are important for the claimed subject matter as polymers provide resistance and durability to the coating material without little to no impact on the other components of the coating matter.

Note the claimed liquid coating composition matter is a coating composed of a vulcanized polymer. Vulcanization is defined as the curing of elastomers, with the terms "vulcanizadon" and "curing" sometimes used interchangeably in this context. Vulcanization is a chemical process that converts natural rubber and other polydiene elastomers into crosslinked polymers, which help promote the polymers' physical properties by allowing two polymer chains to join together. Therefore, vulcanization is an essential step for the claimed subject matter as it will enable the vulcanized polymer to increase its mechanical properties while increasing its durability.

Figure 2:
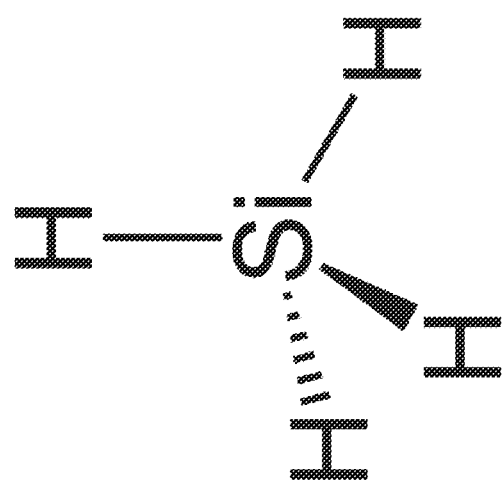
FIG. 2 is an illustration of the two-dimensional chemical structure of silane.

The claimed liquid coating composition matter includes a silane crosslinking agent. Silane is an inorganic compound with the chemical formula, $SiH_4$, as shown in FIG. 2. Silane can be used to crosslink polymers to improve their tear, elongation, propagation, and abrasion resistance. Such silane agents used in forming the claimed subject natter can be oxime functional, acetoxy functional, or alkoxy functional. Silane coupling agents are compounds containing functional groups able to bond with organic and inorganic materials. Is this characteristic that makes silane agents useful in improving the strength of composite material, resin and surface modifications and adhesion. Functional groups are specific groups of atoms within molecules that are responsible for the characteristic chemical reactions of those molecules. The same functional group will undergo the same or similar chemical reactions regardless of the size of the molecule it is part of. However, its relative activity can be modified by nearby functional groups.

The silane crosslinking agent of the claimed composition that is oxime functional may be selected from the group of: methytris(methyl-ethyl ketoxime)silane, vinyltril(methyl-ethyl ketoxime)silane, and phenyltris(methyl-ethyl ketoxime)silane. The silane crosslinking agent of the claimed composition that is acetoxy functional may be selected from the group of: methyl(tracetoxy)silane, ethyl(tracetoxy)silane, and propyl(tracetoxy)silane. The silane crosslinking agent of the claimed composition that is alkoxy functional may be selected from the group of: methyltrimethoxy silane and methyltriethoxysilane.

Figure 3:
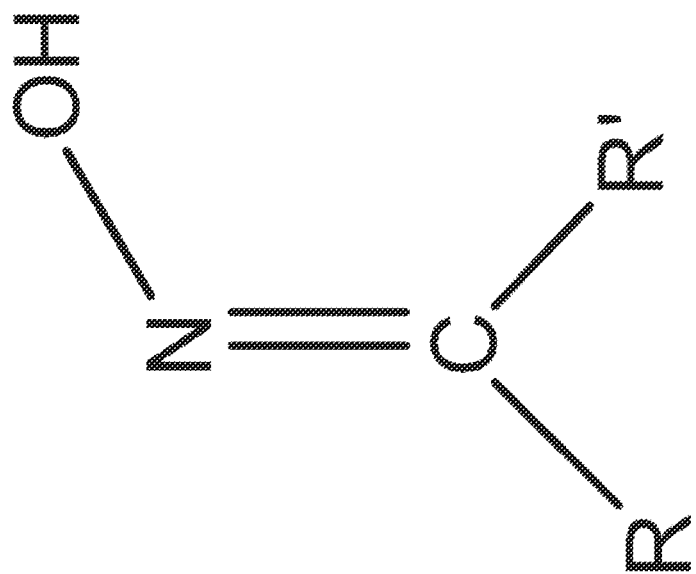
FIG. 3 is an illustration of a two-dimensional chemical structure of an oxime group.

Oxime functional groups consist of a hydroxyl group bonded to a nitrogen atom, as shown in FIG. 3. They are derived from hydroxylamine, aldehyde, and ketone. Oxime silane-based crosslinkers produce neutral curing silicone sealants, which allow for good adhesion to a variety of substrates including wood, while being low corrosive to metallic substrates.

Figure 4:
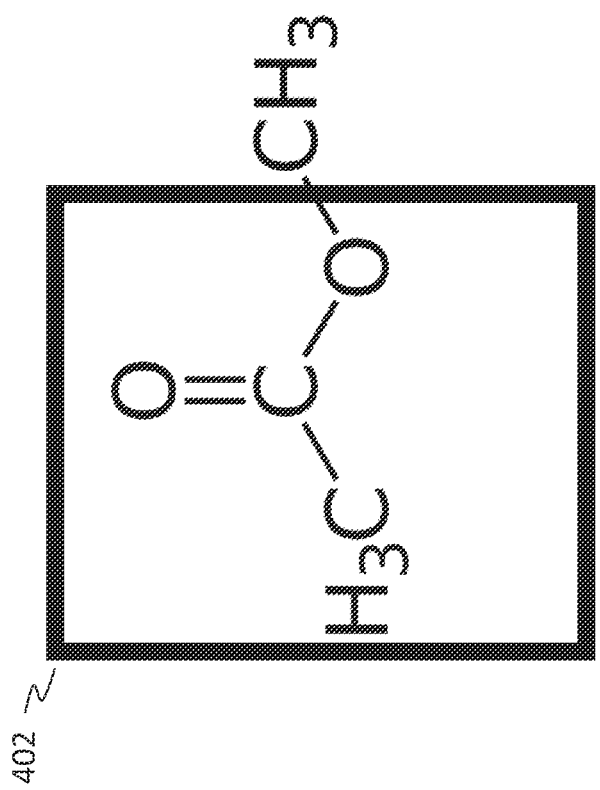
FIG. 4 is an illustration of a two-dimensional chemical structure showing the acetoxy group structure.

Acetoxy functional groups are a chemical functional group of the structure $CH_3-C(=O)-O-$, as shown in set 402 of FIG. 4. Acetoxy silane agents have fast curing times, become tack-free within minutes, and have good adhesion to any surface. However, these agents are corrosive to metallic substrates, which could present a problem on barrels bound by metal hoops.

Figure 5:
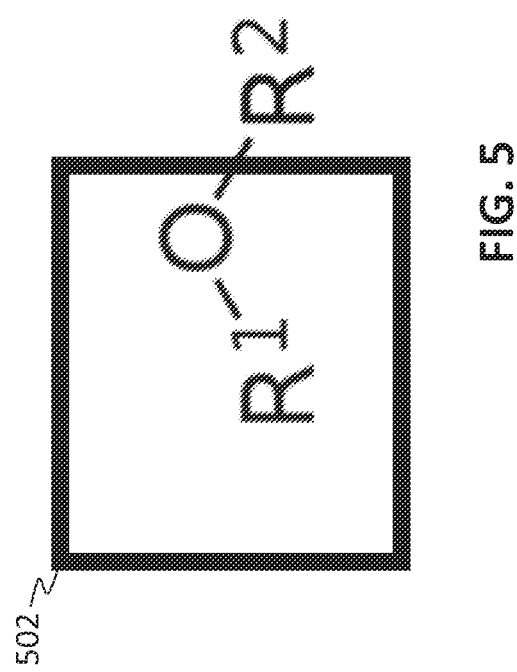
FIG. 5 is an illustration of a two-dimensional chemical structure showing the alkoxy group structure.

Finally, alkoxy functional groups are alkyl groups singularly bonded to oxygen, thus R—O, as shown in set 502 of FIG. 5. Alkoxy functional silanes have neutral curing qualities, are non-corrosive to metallic substrates, and provide good adhesion. Overall, the decision on the type of silane agent will depend on the composition of the barrel used and the curing speed needed. By having adhesive qualities along with the resistance and durability provided by the vulcanized polymers, the formulated coating will be able to remain attached to the exterior surface of the barrel for a long period of time, such as 16 to 21 years.

Figure 6:
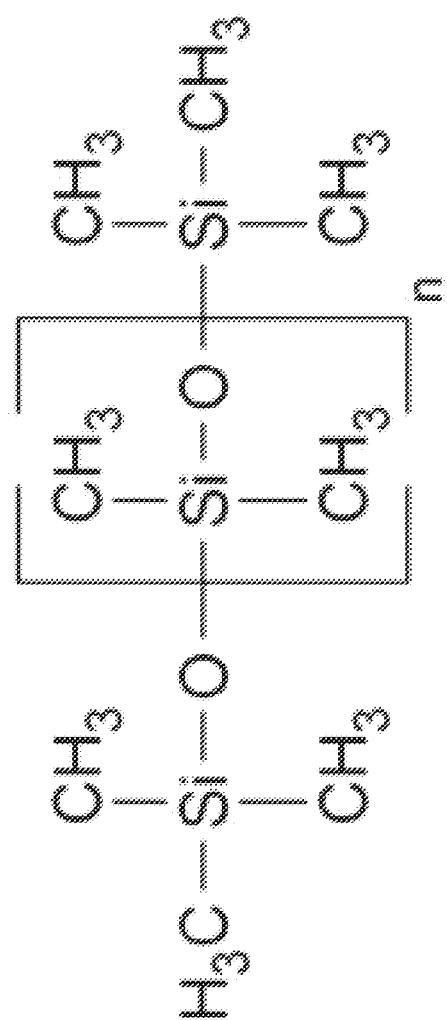
FIG. 6 is an illustration of a two-dimensional basic chemical structure of polysiloxane.

Besides having a silane crosslink agent, the vulcanized polymer must have a hydroxy-terminated polysiloxane with moisture curing capabilities in the presence of water vapors and silane crosslinking agents. Polysiloxanes, also known as silicones, consist of a silicon and oxygen backbone chain, with two organic groups attached to each silicon center, as shown in FIG. 6. By varying the chain length, side groups, and crosslinks, they can be synthesized with various properties and compositions.

As related to polymers, curing is the process by which a chemical reaction takes place, resulting in a harder, tougher, and more stable linkage, such as an adhesive bond or coating. Moisture curable polysiloxane compositions are silicones cured in the presence of moisture-forming crosslinked materials, as required by the claimed subject matter. This coating forms a protective film by chemically reacting with the moisture present in the air, hence moisture-curing.

Oligomers are low to medium molecular weight polysiloxanes and can be used as intermediates in resin synthesis. These branched, 3-dimensional polysiloxanes contain functional groups that can react with raw materials used in organic resins, which means that they can be used as a building block in the synthesis of resins used for coatings. Such polysiloxane oligomers often contain hydroxyl (—OH) groups, as shown by FIG. 1, and as required by the claimed subject matter. Hydroxyl groups consist of an oxygen and hydrogen atom held together by a single covalent bond and carry a negative electric charge. It functions as a base, a ligand, a nucleophile, and a catalyst.

The polysiloxanes with hydroxy termination must exhibit low permeance after curing, which means they must act as vapor barriers by preventing water vapors from passing through. Silicones have many useful characteristics, one being the ability to repel water and form watertight seals. Additionally, silicones have high gas permeability, meaning that oxygen's permeability will be approximately 400 times that of synthetic rubber at room temperature. Thus, the low permeance requirement will be met without affecting the entrance of oxygen inside the aging barrel, allowing the distilled alcoholic beverage to be oxygenated.

Low permeance refers to less than 10 perms. Low permeability vapor retarders are typically rated greater than 1.0 perms and less than or equal to 10 perms. As an example, latex or enamel paint qualify as low permeability vapor retarders.

Lastly, the claimed subject matter must include transition metal catalysts such as dibutyltin dilaurate ("DBTL") or dibutyltin acetate ("DBTA"). DBTL can aid the curing process of silicone resins and silane-modified polymers. DBTA is used as a catalyst in esterification, transesterification, and condensation reactions. Additionally, those catalysts have been used in the presence of bulk water or alcohol to dehydro-couple polysiloxanes to improve their room temperature curability. The chemical reaction of the coating being composed of the above-described component along with the metal catalyst DBTL and DBTA react in a manner that reduces ethanol and water vapor transport outside the barrel, thus reducing the rate of evaporation inside the aging barrels.

The claimed subject matter includes a transition metal catalyst that provides a reaction crosslink density that allows for minimal transport of ethanol vapors and water vapors after curing and may include a second transition metal catalyst that provides a reaction crosslink density with minimal impact on the rate of oxygen gas transport rate after curing. Alternatively, the claimed subject matter includes a transition metal catalyst with the same characteristics as the two metal catalysts described above. Minimal transport is defined as having reduced the baseline amount of ethanol and water vapor transport. In one embodiment, minimal transport is defined as greater than a 40% reduction in ethanol and water vapor evaporation. Minimal impact of oxygenation is defined as not altering the sensory profile of the spirit maturing in the barrel, using a standard test. If the oxidative reactions are manipulated due to an impact or reduction of the oxygen transport rate through the barrel, then a notable detection of the change of the spirit will be observed. An industry standard method for a sensory analysis of the spirit is codified in the ASTM E3009-15—Standard Test Method for Sensory Analysis, otherwise known as the Tetrad Test. Another industry method for a sensory analysis of the spirit is the triangle test.

The claimed subject matter includes inorganic polymers with a siloxane backbone that exhibits no leaching, migration or notable reaction with a liquid alcohol and water mixture upon curing. A notable reaction is defined as altering the sensory profile of the spirit maturing in the barrel, using a standard test. If the chemical migration of the coating or any reaction of the coating with the spirit occur, then a notable reaction will occur, resulting in a notable detection of the change of the spirit. The industry standard method for a sensory analysis of the spirit may be used, i.e., the Tetrad Test.

The application rate or thickness of the applied coating may be adjusted to achieve variable transmission rates of ethanol and water or oxygen to provide unique and customized control of the angels' share. For example, if total vapor transmission rates are required to be zero, as in the case of white wine, then the coating may be applied thick enough to shut down and completely restrict oxygen transmission into the barrel. On the other hand, if just a 20% reduction in transmission is suitable and desired, a lighter coating application may be applied to achieve the desired results. In particular embodiments, the coating may be applied at about 0.024 inches (24 mils) thick and provide a permeance rating of less than 10 g/m$^2$.

When applied to the aging barrels, the claimed liquid coating composition of matter will reduce evaporation and transmission through the barrel while still allowing for adequate oxygen transmission and not deleteriously affecting the flavor profile of the desired beverage. Thus, providing a needed improvement to the prior art and a solution to the angels' share issue faced by those skilled in the art of barrel aging distilled alcoholic beverages.

It will be appreciated by persons skilled in the art that the present invention is not limited to what has been particularly shown and described hereinabove. A variety of modifications and variations are possible in light of the above teachings without departing from the scope and spirit of the invention, which is limited only by the following claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A liquid coating composition of matter for application to wooden barrels or casks used in distilling, the composition of matter comprises:
    a) a polymer vulcanized with a silane crosslinking agent that is alkoxy-functional;
    b) an OH-terminated polysiloxane that exhibits moisture curing, condensation reactions when in the presence of water vapors and silane crosslinkers;
    c) a low to medium molecular weight polysiloxane that exhibits low-permeance after curing via moisture-cure, condensation reaction;
    d) a transition metal catalyst comprising dibutyltin dilaurate or dibutyltin acetate that provides a reaction crosslink density that allows for minimal transport of ethanol vapors and water vapors after curing;
    e) a second transition metal catalyst comprising dibutyltin dilaurate or dibutyltin acetate that provides a reaction crosslink density with minimal impact on the rate of oxygen gas transport rate after curing; and
    f) inorganic polymers with a siloxane backbone that exhibits no leaching, migration or notable reaction with a liquid alcohol and water mixture upon curing.

2. The composition of matter of claim 1, wherein the vulcanized polymer of claim 1 is a polysiloxane.

3. The composition of matter of claim 2, wherein the polysiloxane is a polydimethylsiloxane.

4. The composition of matter of claim 3, wherein the vulcanized polymer of claim 1 has a hydroxy termination.

5. The composition of matter of claim 4, wherein the hydroxy termination is a silanol.

6. The composition of matter of claim 5, wherein the silane crosslinking agent of claim 1 that is oxime functional is selected from the group of: methytris(methyl-ethyl ketoxime)silane, vinyltril(methyl-ethyl ketoxime)silane, and phenyltris(methyl-ethyl ketoxime)silane.

7. The composition of matter of claim 6, wherein the silane crosslinking agent of claim 1 that is acetoxy functional is selected from the group of: methyl(tracetoxy)silane, ethyl(tracetoxy)silane, and propyl(tracetoxy)silane.

8. The composition of matter of claim 1, wherein the silane crosslinking agent of claim 1 that is alkoxy functional is selected from the group of: methyltrimethoxysilane and methyltriethoxysilane.

9. The composition of matter of claim 8, wherein the coating composition has an alcohol and water vapor permeance of 10 g/m$^2$/day when applied in a 0.024 inches (24 mils) thickness.

10. A liquid coating composition of matter for application to wooden barrels or casks used in distilling, the composition of matter comprises:
    a) a polymer vulcanized with a silane crosslinking agent that is alkoxy-functional;
    b) an OH-terminated polysiloxane that exhibits moisture curing, condensation reactions when in the presence of water vapors and silane crosslinkers;

c) a low to medium molecular weight polysiloxane that exhibits low-permeance after curing via moisture-cure, condensation reaction;
d) a transition metal catalyst comprising a titanate compound that provides a reaction crosslink density that allows for minimal transport of ethanol vapors and water vapors after curing and that provides a reaction crosslink density with minimal impact on the rate of oxygen gas transport rate after curing; and
e) inorganic polymers with a siloxane backbone that exhibits no leaching, migration or notable reaction with a liquid alcohol and water mixture upon curing.

11. The composition of matter of claim 10, wherein the vulcanized polymer of claim 10 is a polysiloxane.

12. The composition of matter of claim 11, wherein the polysiloxane is a polydimethylsiloxane.

13. The composition of matter of claim 12, wherein the vulcanized polymer of claim 12 has a hydroxy termination.

14. The composition of matter of claim 13, wherein the hydroxy termination is a silanol.

15. The composition of matter of claim 14, wherein the silane crosslinking agent of claim 1 that is oxime functional is selected from the group of: methytris(methyl-ethyl ketoxime)silane, vinyltril(methyl-ethyl ketoxime)silane, and phenyltris(methyl-ethyl ketoxime)silane.

16. The composition of matter of claim 15, wherein the silane crosslinking agent of claim 1 that is acetoxy functional is selected from the group of: methyl(tracetoxy)silane, ethyl(tracetoxy)silane, and propyl(tracetoxy)silane.

17. The composition of matter of claim 10, wherein the silane crosslinking agent of claim 12 that is alkoxy functional is selected from the group of: methyltrimethoxysilane and methyltriethoxysilane.

18. The composition of matter of claim 17, wherein the coating composition has an alcohol and water vapor permeance of 10 $g/m^2$/day when applied in a 0.024 inches (24 mils) thickness.

* * * * *